US006409008B1

(12) United States Patent
Newsome

(10) Patent No.: US 6,409,008 B1
(45) Date of Patent: Jun. 25, 2002

(54) TURNOVER CONVEYOR

(76) Inventor: John R. Newsome, 15987 N. 700th St., Shumway, IL (US) 62461

( * ) Notice: Subject to any disclaimer, the term of this patent is extended or adjusted under 35 U.S.C. 154(b) by 1 day.

(21) Appl. No.: 09/784,698

(22) Filed: Feb. 15, 2001

(51) Int. Cl.[7] .................. B65G 47/24; B65G 15/00; B65G 17/00; B65G 29/00; B65H 29/00
(52) U.S. Cl. .................. 198/403; 198/405; 198/604; 271/185; 271/186
(58) Field of Search .................. 198/402, 403, 198/405, 406, 407, 411, 417, 604; 271/184, 185, 186; 270/58.06

(56) References Cited

U.S. PATENT DOCUMENTS

| 3,161,292 A | | 12/1964 | Van Dalen |
| 3,280,995 A | * | 10/1966 | Barkley ..................... 198/405 |
| 3,729,189 A | | 4/1973 | Watson |
| 3,838,771 A | | 10/1974 | Whiteford |
| 4,226,324 A | * | 10/1980 | Stocker ..................... 198/405 |
| 4,364,463 A | | 12/1982 | Faltus |
| 4,569,620 A | | 2/1986 | Lynch |
| 4,669,715 A | | 6/1987 | Jeschke |
| 4,690,268 A | * | 9/1987 | Ueshin ..................... 198/399 |
| 5,411,250 A | | 5/1995 | Belec et al. |
| 5,478,063 A | * | 12/1995 | Linder et al. ............... 198/417 |
| 5,540,318 A | | 7/1996 | Hulse |
| 5,868,240 A | * | 2/1999 | Knoepfel et al. ........... 198/405 |
| 5,967,505 A | * | 10/1999 | Lin et al. ............... 112/475.04 |
| 5,988,352 A | | 11/1999 | Ballestrazzi et al. |

* cited by examiner

Primary Examiner—Christopher P. Ellis
Assistant Examiner—Gene O. Crawford
(74) Attorney, Agent, or Firm—Alston & Bird LLP

(57) ABSTRACT

A conveyor system lifts advancing signatures from a conventional conveyor, conveys the lifted signatures along an upright path of travel, turns the advancing signatures from the upright path of travel to a downward path of travel, deposits the advancing signatures from the downward path of travel back onto the conventional conveyor, and rotates the advancing signatures 180° about an axis which is parallel to their path of travel during either their upward path of travel or their downward path of travel so that the signatures are turned over when deposited back onto the conventional conveyor.

32 Claims, 7 Drawing Sheets

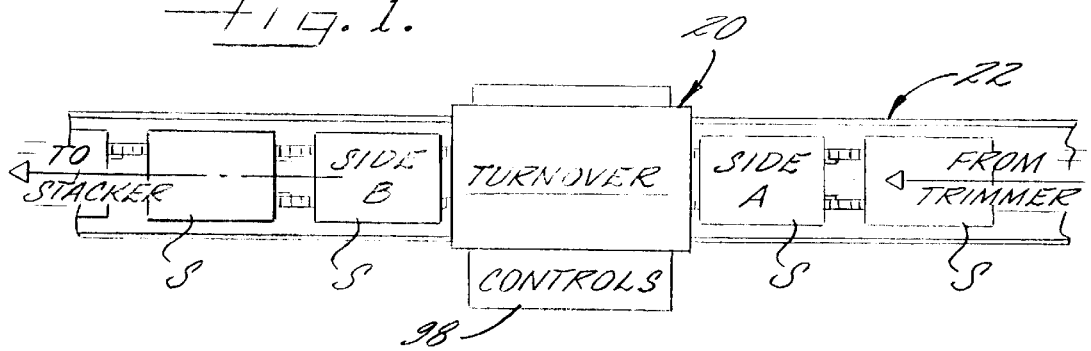
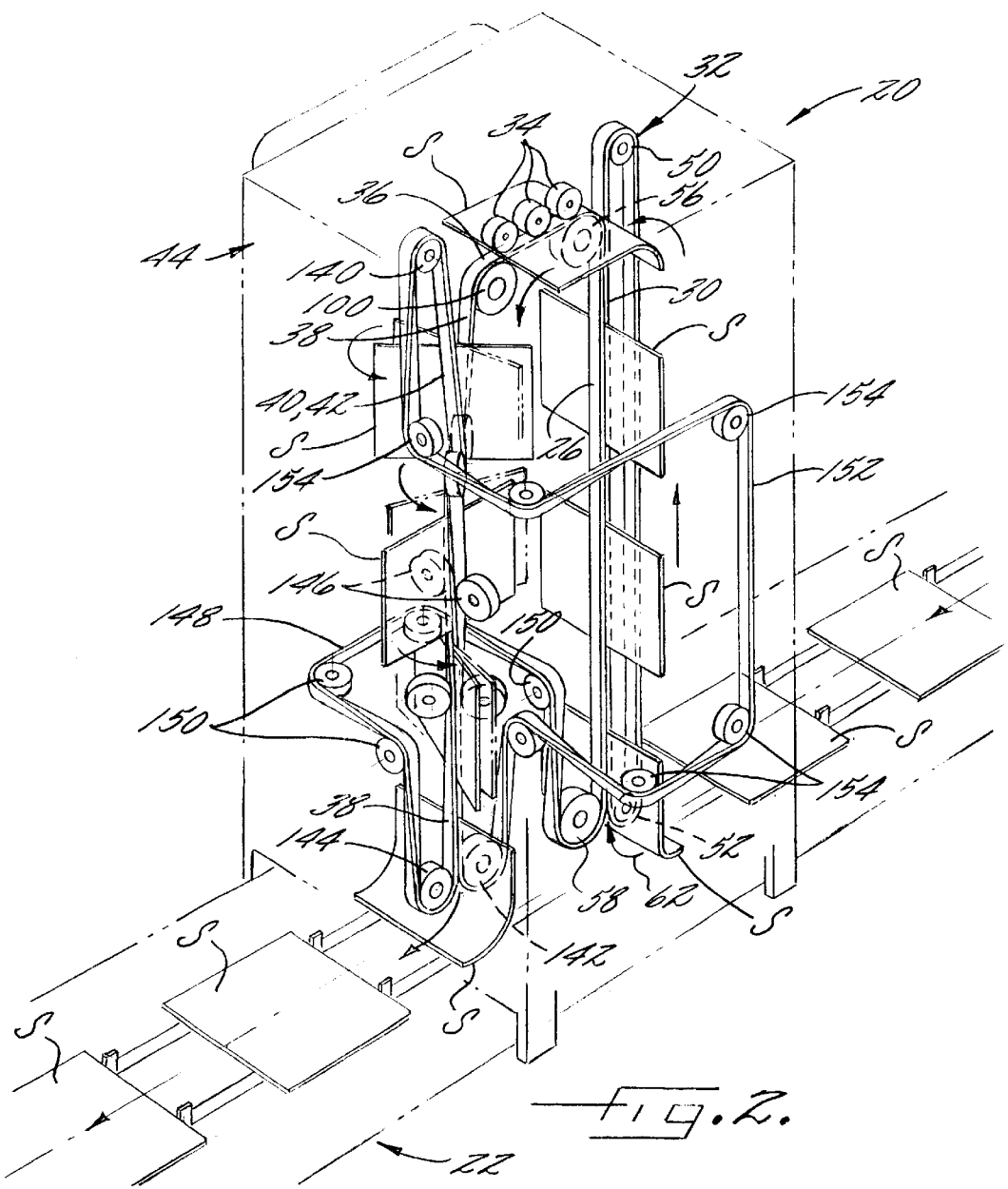

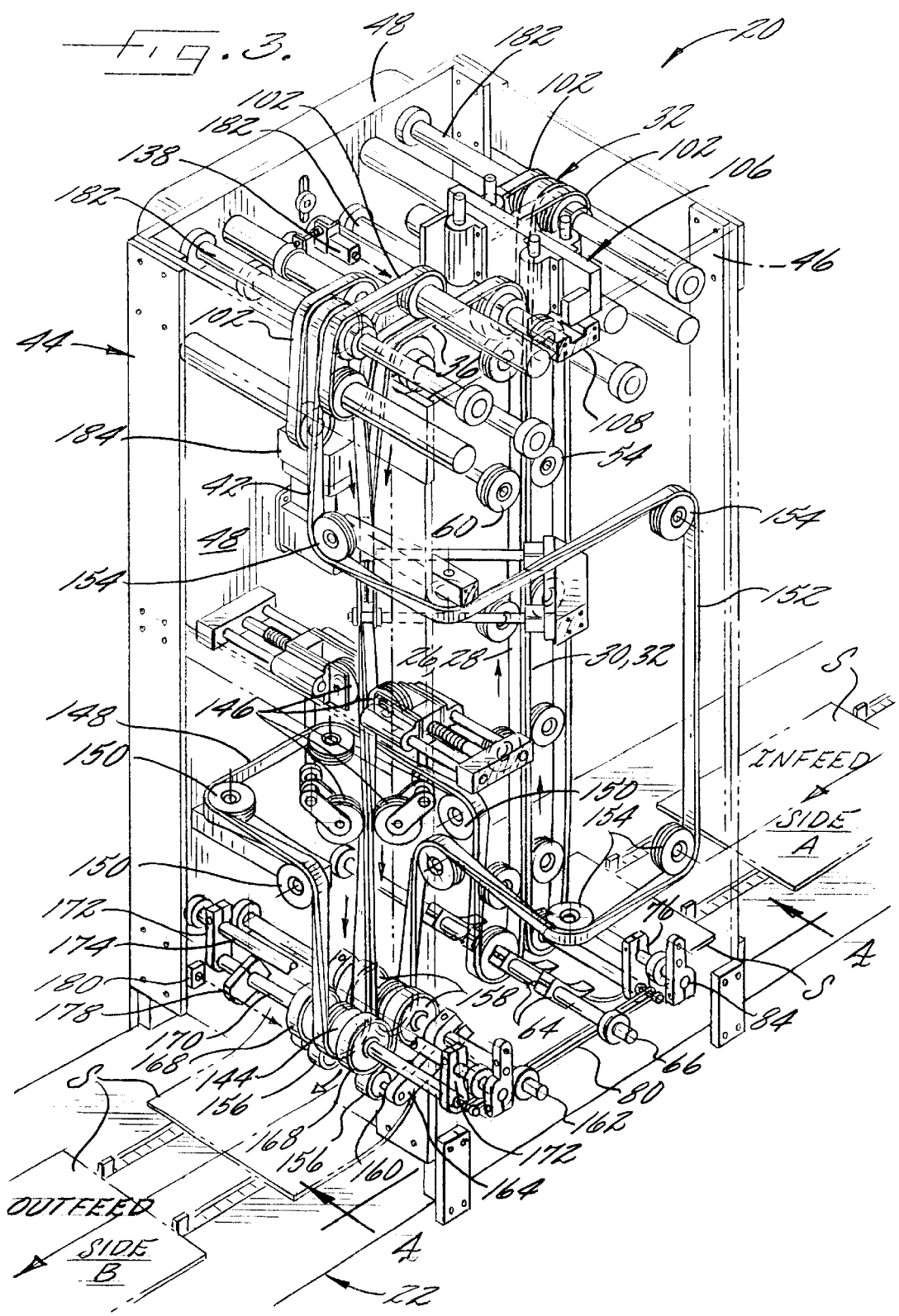

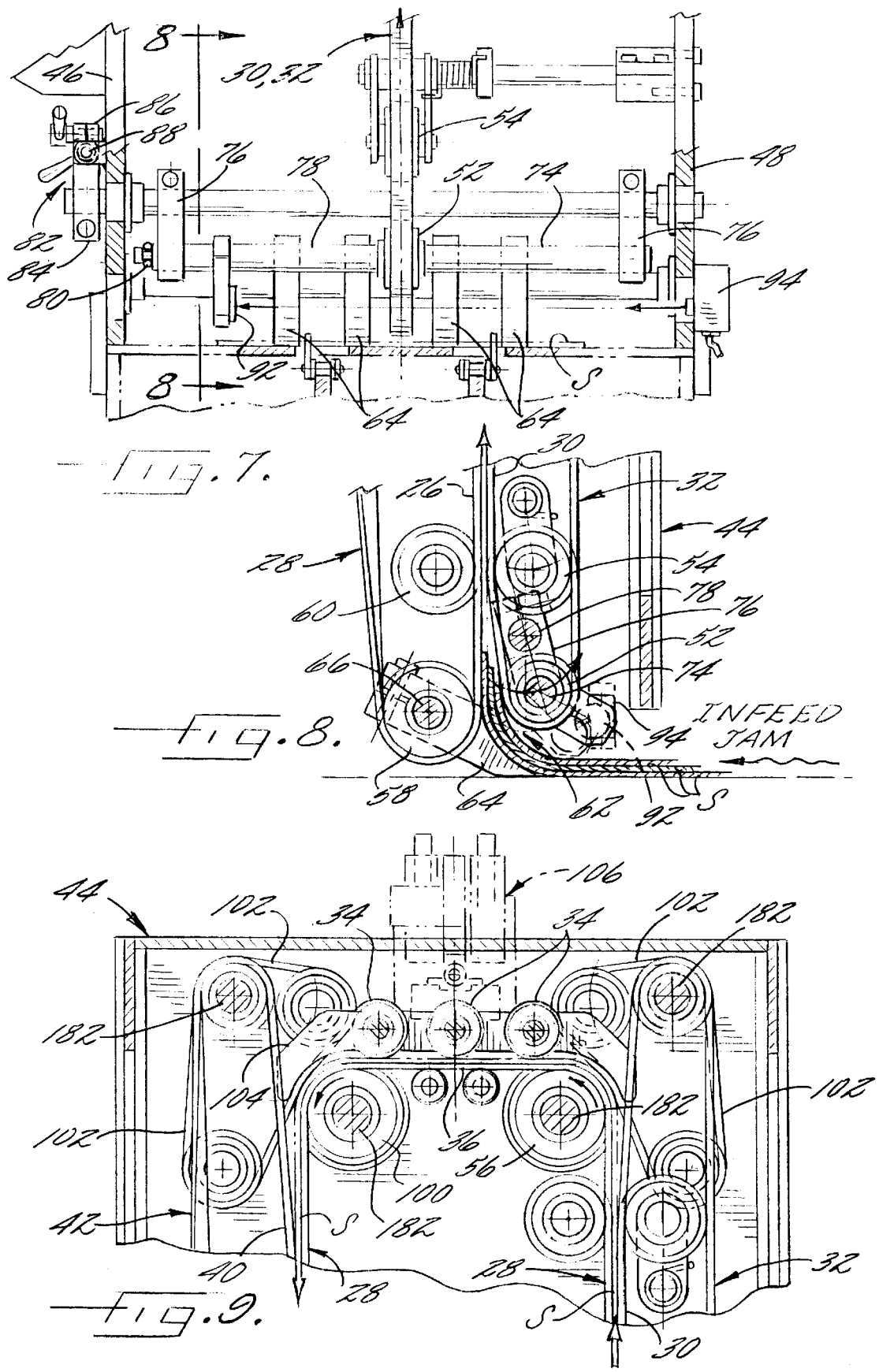

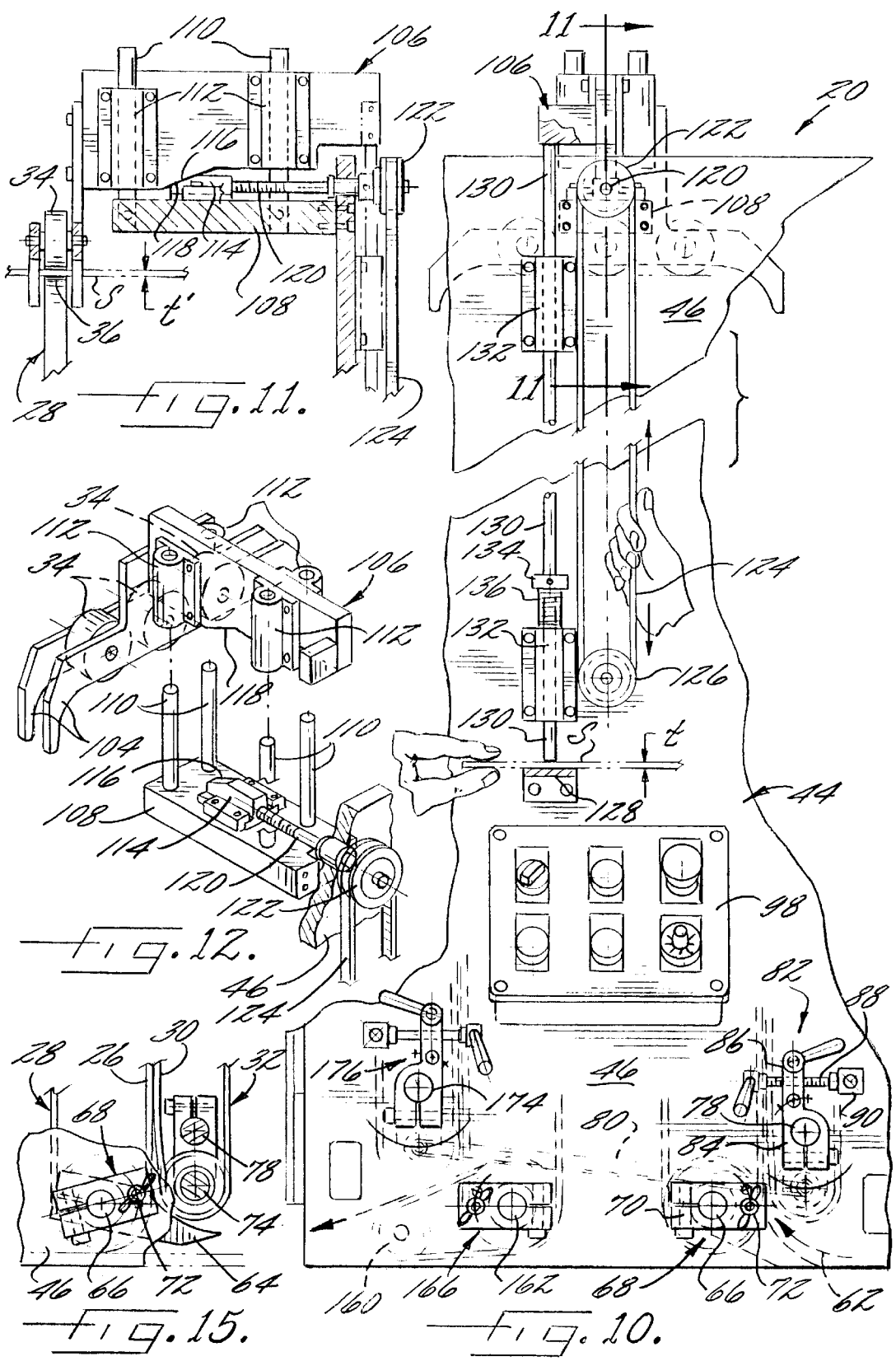

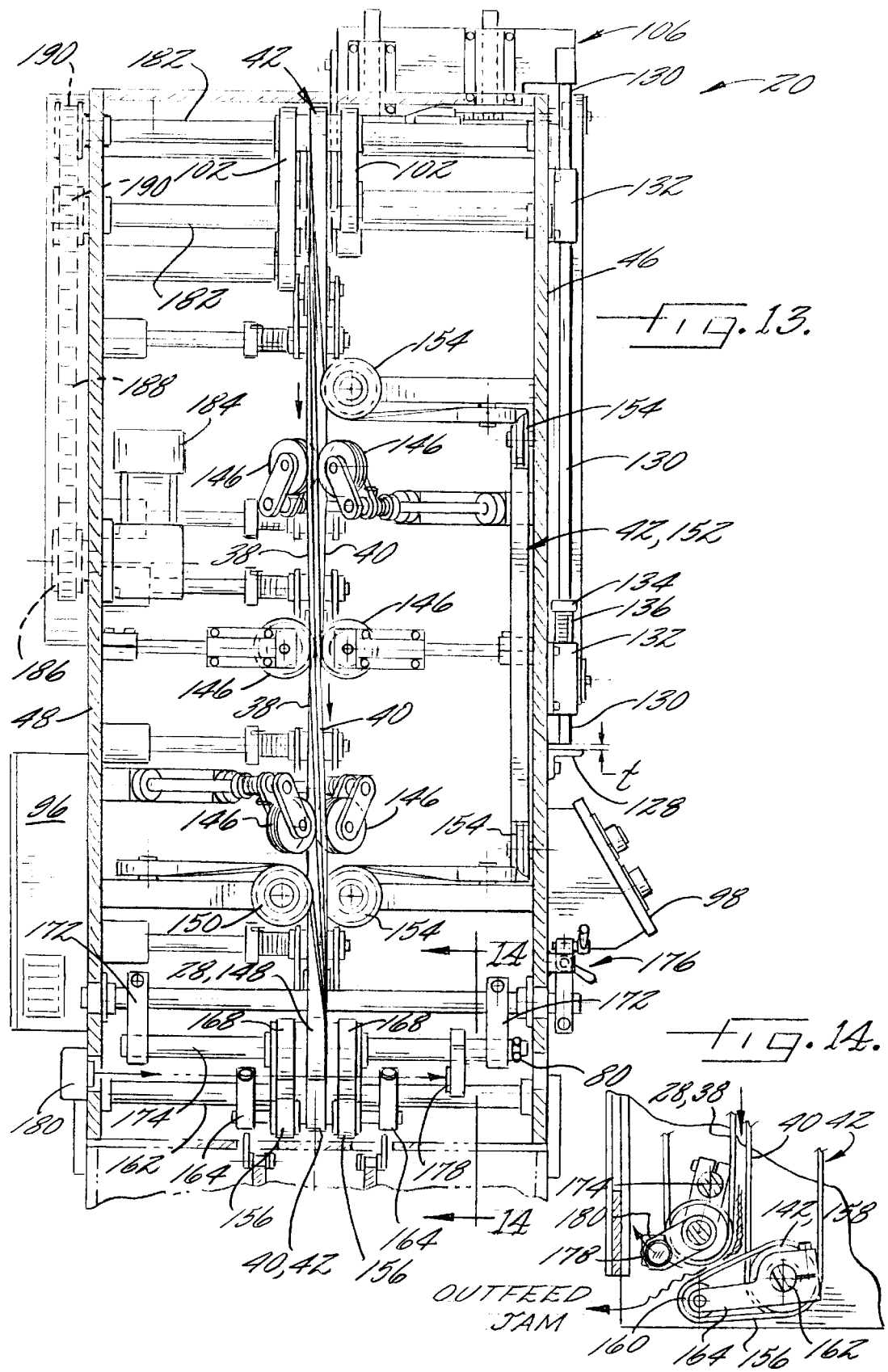

TURNOVER CONVEYOR

FIELD OF THE INVENTION

The present invention pertains to conveyor belt systems for turning over printed products.

BACKGROUND OF THE INVENTION

Magazines, books, periodicals, newspapers, and other similar printed products, referred to herein as signatures, are commonly discharged from a binding or similar machine and conveyed along a path of travel to a stacker or other processing station. Depending upon how the covers of the signatures are designed, the publisher may want to place labels on either the top or the bottom surfaces. To provide this option, it is desirable to be able to turn over the advancing signatures, so that a label applying unit which is at a fixed location can be utilized.

Conveyor belt systems for turning over printed products are known. For example, U.S. Pat. Nos. 3,729,189; 3,838,771; 4,226,324; 4,569,620; 4,669,715; 5,540,318 and 5,988,352 each disclose conveyors for contemporaneously conveying and rotating printed products through 180°, so that the products are turned over. For these patents, the products are rotated about an axis that extends in the direction of travel, and the direction of travel is horizontal. As a result, the conveyor systems can be characterized as occupying a relatively large amount of floor space, which can be disadvantageous in many circumstances.

In contrast, U.S. Pat. No. 4,364,463 discloses a conveyor that turns over newspapers by rotating the newspapers about an axis that extends in the direction of travel, with the direction of travel being vertical. However and disadvantageously, this patent does not disclose that a turned over newspaper can be conveniently and efficiently returned to the same conveyor from which it originated.

Accordingly, there is a need for a conveyor belt system that is capable of turning over signatures while occupying a relatively small amount of floor space, and that is preferably further capable of lifting the signatures from and depositing the signatures onto the same conveyor, with the signatures being turned over when they are deposited and each signature preferably being deposited onto the same moving station from which it was lifted.

SUMMARY OF THE INVENTION

In accordance with one aspect, the present invention advantageously solves the above and other problems by providing a turning apparatus having a conveyor system for lifting advancing signatures from a conventional conveyor, conveying the lifted signatures along an upright path of travel, turning the advancing signatures from the upright path of travel to a downward path of travel, depositing the advancing signatures from the downward path of travel back onto the conventional conveyor, and rotating the advancing signatures 180° about an axis which is parallel to their path of travel during either their upward path of travel or their downward path of travel so that the signatures are turned over when deposited back onto the conventional conveyor. According to this aspect, the turning apparatus is advantageously capable of occupying a relatively small amount of floor space and is further capable of lifting the signatures from and depositing the signatures onto the same conventional conveyor. The conventional conveyor can be characterized as having multiple moving stations, and preferably the signatures are respectively returned to the same moving station from which they were lifted.

In accordance with another aspect of the present invention, the conveyor system includes a driven central belt having an upright upstream flight for engaging and conveying the stream of signatures in an upward direction, and an upright downstream flight that is downstream of the upstream flight in the stream of signatures and is for engaging and conveying the stream of signatures in a downward direction. One of the flights has a twisted section that is twisted substantially 180° about an axis parallel to the flight. In accordance with this aspect, the conveyor system has another driven belt having a section that is twisted substantially 180°, runs in face-to-face relation with the twisted section of the central belt, and is for engaging and conveying the stream of signatures so that the twisted sections of the belts cooperate to twist the stream of signatures substantially 180° while together conveying the stream of signatures.

In accordance with another aspect of the present invention, the central belt further includes a generally horizontal intermediate flight for engaging and conveying the stream of signatures between the upstream and downstream flights of the central belt.

In accordance with another aspect of the present invention, the turning apparatus can advantageously be bypassed by manipulating inlet and outlet diverters, so that the signatures advancing along the conventional conveyor are not turned over by the turning apparatus. The inlet diverter is for lifting the signatures from the conventional conveyor, and the outlet diverter is for depositing the signatures onto the conventional conveyor.

In accordance with another aspect of the present invention, one or more of the belts include a return flight that is not for conveying signatures. The return flight defines a convolute path having portions extending perpendicularly from a plane defined by the path of travel of the signatures, so that the size of the turning apparatus can advantageously be minimized.

In accordance with another aspect of the present invention, the conveyor system includes a variably sized nip through which the signatures pass. A sensor is provided for detecting when the nip has become too large, such as a result of being jammed with signatures. The system is advantageously automatically shut down when the sensor detects a jam. A mechanism is provided for adjusting the size of the nip so that the turning apparatus can accommodate signatures of different thickness. In one example, an adjustment mechanism that is advantageously remote from the nip can be operated to adjust the size of the nip, and structure is provided to emulate the size of the nip at the adjustment mechanism, so that the nip can be accurately remotely adjusted.

Aspects and advantages of the present invention in addition to those described above will be apparent to those of ordinary skill in the art upon studying the following descriptions and associated drawings.

BRIEF DESCRIPTION OF THE DRAWINGS

Figure 4:
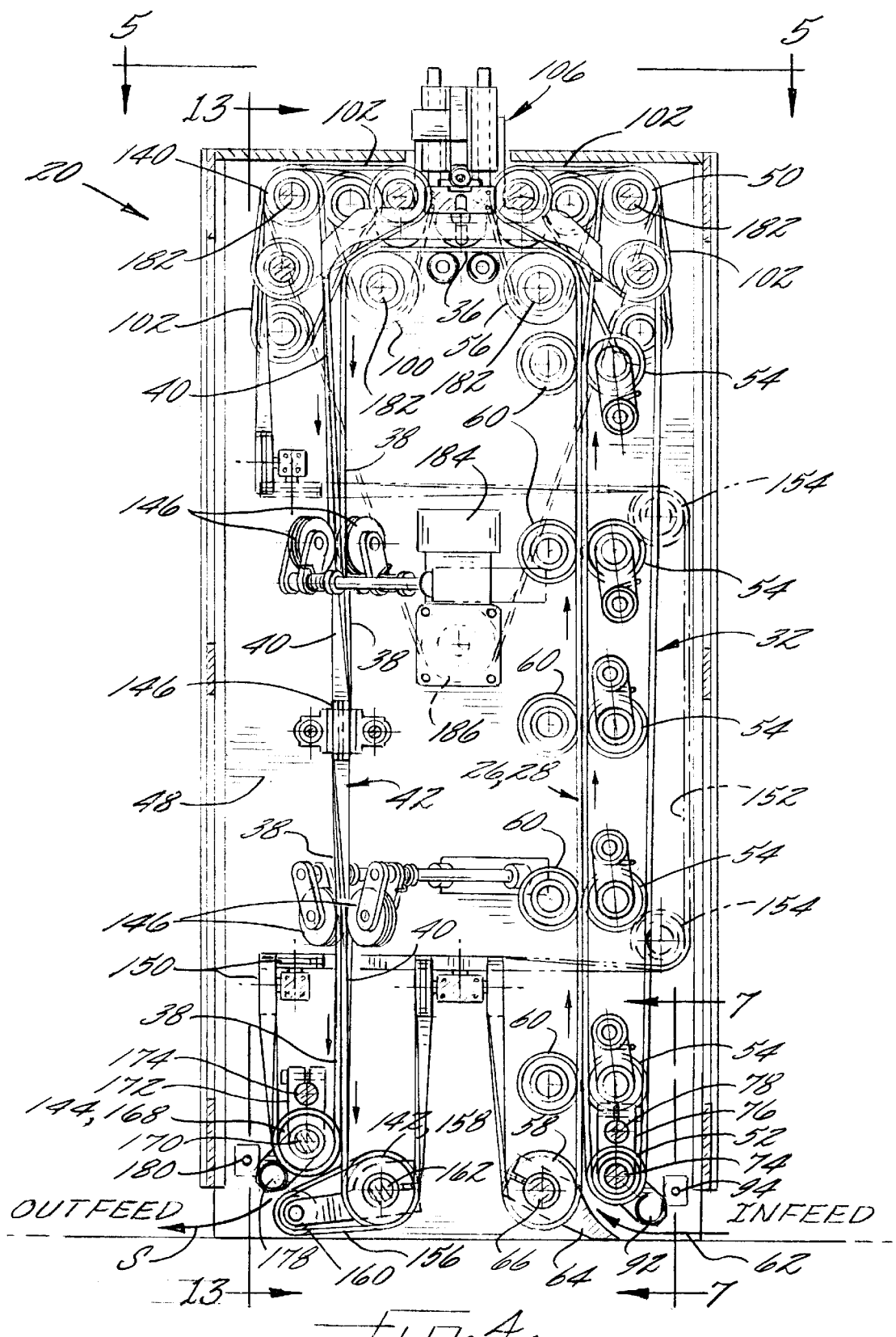
Figure 5:
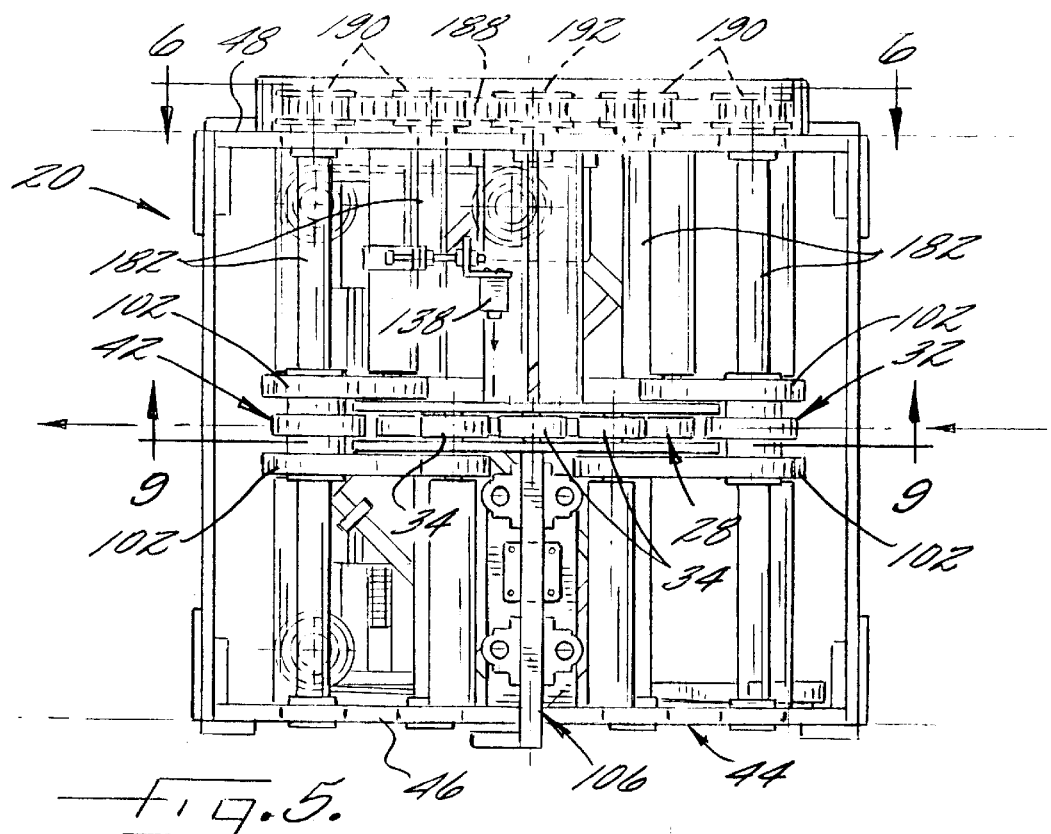
Figure 6:
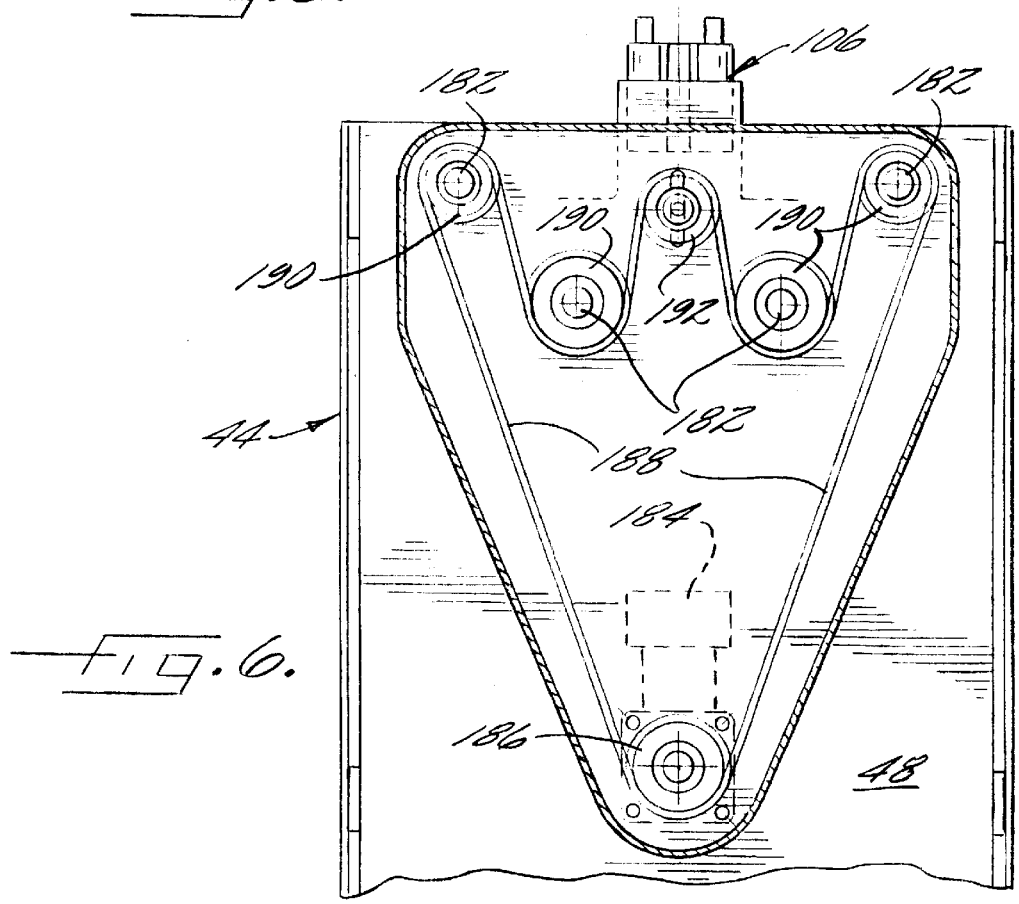

Having thus described the invention in general terms, reference will now be made to the accompanying drawings, which are not necessarily drawn to scale, and wherein:

FIG. 1 is a top plan view of a turning apparatus positioned above a conventional conveyor carrying signatures;

FIG. 2 is a front/left side perspective view of portions of the combination illustrated in FIG. 1, showing the turning apparatus turning over the signatures by lifting advancing signatures from the conventional conveyor, conveying and twisting the advancing signatures, and then depositing the advancing signatures back onto the conventional conveyor;

FIG. 3 is a partial view that is similar to FIG. 2, with the turning apparatus shown in greater detail;

FIG. 4 is a partial, front elevational view of the turning apparatus;

FIG. 5 is a partial, top plan view of the turning apparatus;

FIG. 6 is a partial, rear elevational view of the turning apparatus illustrating a driving mechanism thereof;

FIG. 7 is a partial, right-side elevational view of the turning apparatus illustrating an inlet area thereof;

FIG. 8 is a partial, cross-sectional view taken along line 8—8 of FIG. 7 and illustrating a jam of signatures in the inlet area of the turning apparatus;

FIG. 9 is a partial, cross-sectional view of an upper portion of the turning apparatus taken along line 9—9 of FIG. 5;

FIG. 10 is a partial, front elevational view of the turning apparatus;

FIG. 11 is a partial, cross-sectional view of an upper portion of the turning apparatus taken along line 11—11 of FIG. 10;

FIG. 12 is a perspective exploded view illustrating a portion of a mechanism for adjusting an intermediate nip of the turning apparatus;

FIG. 13 is a partial, left elevational view of the turning apparatus;

FIG. 14 is partial, cross-sectional view taken along line 14—14 of FIG. 13 and illustrating an outlet portion of the turning apparatus jammed with signatures; and FIG. 15 is a partial, front elevational view illustrating the inlet area of the turning apparatus with an inlet diverter in a bypassing configuration.

DETAILED DESCRIPTION OF THE INVENTION

The present invention now will be described more fully hereinafter with reference to the accompanying drawings, in which an exemplary embodiment of the invention is schematically shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Overview

Referring to FIG. 1, a turning apparatus 20 is positioned above and cooperates with a conventional conveyor 22 that is conveying signatures S so that the signatures are serially advanced from right to left in FIG. 1. A method of operation of the turning apparatus 20 and some of the structure of the turning apparatus will now be briefly described with reference to FIG. 2. The turning apparatus 20 is sequentially lifting the signatures S from the conventional conveyor 22. The upstream conveyor section conveys the signatures S along an upright path between an upward traveling upstream flight 26 of a driven central belt 28 and an upward traveling signature-engaging flight 30 of a driven upstream belt 32. The signatures S are passed from the upstream conveyor section to an intermediate conveyor section. The intermediate conveyor section conveys the signatures along a horizontal path of travel between a series of nip rollers 34 and a horizontally traveling intermediate flight 36 of the central belt 28. The signatures S are passed from the intermediate conveyor section to a downstream conveyor section. The downstream conveyor section conveys the signatures along a downward path between a downward traveling downstream flight 38 of the central belt 28 and a signature-engaging flight 40 of a driven downstream belt 42.

As illustrated in FIG. 2, each of the downstream flight 38 of the central belt 28 and the signature-engaging flight 40 of the downstream belt 42 include a twisted section that is twisted substantially 180° about an axis parallel to these flights. Those twisted sections are in face-to-face relation with one another for rotating the signatures S advancing through the downstream conveyor section 180° about an axis which is parallel to the path of travel of the signatures through the downstream conveyor section. Thereafter, the signatures are deposited onto the same conventional conveyor 22 from which they were originally lifted.

In FIG. 2, the number of signatures S contemporaneously conveyed by the turning apparatus 20 is exaggerated so as to better illustrate the path of travel of the signatures through the turning apparatus. Preferably the turning apparatus 20 operates at a sufficient speed so that the turning apparatus deposits each signature at the same station on the conventional conveyor 22 from which the turning apparatus lifted the signature. Each of the signatures S illustrated in FIG. 3 is occupying a station of the conventional conveyor, or at least partially occupying the respective station in the case of the signatures respectively being lifted and deposited by the turning apparatus. As best understood with reference to FIG. 3, the distance between the inlet side (i.e., infeed side) and outlet side (i.e., outfeed side) of the turning apparatus 20 is relatively small so that, in accordance with one example, at most only two signatures S are contemporaneously conveyed by the turning apparatus.

Regarding all of the belts of the turning apparatus 20 that are for conveying the signatures S, the turning apparatus 20 includes multiple rotatably mounted pulleys around which these belts respectively travel. Referring to FIGS. 2–4, these pulleys are carried by respective shafts that are either directly or indirectly carried by a frame 44 of the turning apparatus. For example, some of the pulley-carrying shafts are mounted to and extend between a front wall 46 (FIG. 10) and a rear wall 48 (FIG. 3) of the frame 44. Additionally, the circumferential belt-engaging surfaces of these pulleys preferably define v-shaped grooves (not shown) for receiving v-shaped projections (not shown) that extend the length of their respectively associated belts.

Upstream Conveyor Section

Opposite ends of the upstream belt 32 respectively extend around an upper pulley 50 (FIG. 2) and a lower, outer inlet pulley 52 (FIG. 4). Referring to FIG. 4, the upstream belt 32 also extends around a vertical series of spring-biased pulleys 54. Each of the spring-biased pulleys 54 is biased by a spring to force the signature-engaging flight 30 of the upstream belt 32 into face-to-face engagement with the upstream flight 26 of the central belt 28. Due to their spring-loaded nature, the spring-biased pulleys 54 are capable of moving enough so that the upstream conveyor section can accommodate and firmly hold signatures of different thicknesses.

Referring to FIG. 4, opposite ends of the upstream flight 26 of the central belt 28 respectively extend around a right upper pulley 56 and a lower, inner inlet pulley 58. The upstream flight 26 of the central belt 28 also extends around a vertical series of middle pulleys 60. The middle pulleys 60 are mounted so that their movement is limited to rotating about their respective axes, so that they hold the upstream flight 26 of the central belt 28 in face-to-face engagement with the signature-engaging flight 30 of the upstream belt 32.

Inlet Diverter

Referring to FIG. 4 and as will be discussed in greater detail below, signatures S conveyed by the upstream conveyor section are initially drawn into an inlet nip 62 defined between lower ends of the signature-engaging flight 30 of the upstream belt 32 and the upstream flight 26 of the central belt 28. An inlet diverter is provided for selectively diverting the signatures S from the conventional conveyor 22 into the inlet nip 62.

Referring to FIGS. 3–4, the inlet diverter includes a serially arranged group of inlet scoops 64, that can collectively be referred to as an inlet scoop, and mechanisms for controlling the orientation of the inlet scoops. The downstream edges of the inlet scoops 64 are shown above the signature S being introduced into the turning apparatus 20 in FIG. 3 in an effort to more fully show the inlet scoops.

Referring,to FIG. 4, the inlet scoops 64 are rigidly mounted to an inner inlet shaft 66 having opposite ends that are respectively rotatably carried by the front 46 (FIG. 10) and rear walls 48 of the frame 44. That is, the inner inlet shaft 66 is mounted so that it can pivot about its elongate axis, and so that other movements of the inner inlet shaft are restricted. The inner inlet pulley 58 is mounted for freely rotating around the elongate axis of the inner inlet shaft 66.

Referring to FIG. 10, although the inner inlet shaft 66 is mounted to be capable of freely rotating about its elongate axis, an inlet locking mechanism 68 is provided for restricting the rotating of the inner inlet shaft relative to the frame 44. The inlet locking mechanism 68 includes a split collar 70 that is immovably mounted to a front end of the inner inlet shaft 66 that extends through the front wall 46 of the frame 44. A locking bolt 72 extends through a threaded bore in the split collar 70. The head of the locking bolt 72 is positioned adjacent the side of the split collar 70 that is opposite from the frame 44, and the opposite tip of the locking bolt is positioned between the split collar and the front wall 46 of the frame. The locking bolt 72 can be manually rotated about its elongate axis so that the locking bolt is threaded farther into or out of the split collar 70. When the locking bolt 72 is threaded sufficiently far into the split collar 70, the tip of the locking bolt engages the front wall 46 of the frame 40 with sufficient force to prevent rotation of (i.e., lock) the inner inlet shaft 66. When the locking bolt 72 is threaded sufficiently far out of the split collar 70, the tip of the locking bolt is disengaged from the front wall 46 to allow rotation of (i.e., unlock) the inner inlet shaft 66.

The inner inlet shaft 66 can be manually rotated about its elongate axis, while it is unlocked, so that the inlet scoops 64 are pivoted between a diverting configuration illustrated in FIG. 4 and a bypassing configuration illustrated in FIG. 15. The upstream edges of the inlet scoops 64 are at a relatively low elevation for diverting the signatures S from the conventional conveyor 22 into the inlet nip 62 of the upstream conveyor while the inlet scoop is in the diverting configuration. The upstream edges of the inlet scoops 64 are at a relatively high elevation so that the signatures S carried the conventional conveyor 22 bypass the turning apparatus 20 while the inlet scoops are in the bypass configuration. The inlet scoop 64 can be locked in either the diverting configuration or the bypassing configuration by operating the inlet locking mechanism 68 as described above.

Inlet Nip

Referring to FIG. 4, the inlet nip 64 can be characterized as being at least partially defined between the outer inlet pulley 52 and the inner inlet pulley 58 since these pulleys control the positions of the lower portions of the upstream flight 26 of the central belt 28 and the signature-engaging flight 30 of the upstream belt 32. As discussed in greater detail below, the size of the inlet nip 62 is advantageously adjustable so that the turning apparatus can accommodate and retain secure control over signatures S of different thicknesses.

Referring to FIG. 7, the outer inlet pulley 52 is rotatably carried by an outer inlet shaft 74. The opposite ends of the outer inlet shaft 74 are rigidly mounted to inlet split collars 76 that are rigidly mounted to an inlet pivot shaft 78. The opposite ends of the inlet pivot shaft 78 are rotatably carried by the front and rear walls 46, 48 of the frame 44. Referring to FIG. 3, a biasing member 80, which can be in the form of a rubber band, spring, or the like, is connected to the most forward one of the inlet split collars 76. From the perspective of FIG. 4 and FIG. 8, the biasing member 80 biases the inlet pivot shaft 78, and therefore the inlet split collars 76 and the outer inlet shaft 74, to rotate clockwise. Throughout the Detailed Description of the Invention section of this disclosure, the frame of reference for clockwise and counterclockwise is the front elevational view of FIG. 4.

Referring to FIG. 10, an adjustable, inlet arresting mechanism 82 is provided for arresting clockwise rotation of the inlet pivot shaft 78, and the components carried thereby, when the rotation reaches a predetermined amount. More specifically, a front end of the inlet pivot shaft 78 extends through the front wall 46 of the frame 44 and has an arresting split collar 84 rigidly mounted thereto. The arresting split collar 84 has an arm 86 with a threaded bore extending perpendicularly therethrough. An arresting bolt 88 extends through the bore of the arm 86 so that a head of the arresting bolt is on one side of the arm and the opposite tip of the arresting bolt is on the other side of the arm. The tip of the arresting bolt 88 is for abutting a stop 90 rigidly mounted to the front wall 46 of the frame 44 to prohibit further rotation of the inlet pivot shaft 78 and associated components in the clockwise direction.

The arresting bolt 88 can be manually rotated about its elongate axis so that the arresting bolt is threaded farther into or out of the arm 86 of the arresting collar 84, and this allows for adjustment of the predetermined rotational position at which the inlet arresting mechanism 82 terminates clockwise rotation of the inlet pivot shaft 78. Under normal conditions during which the biasing mechanism 80 (FIG. 3) applies the greatest pivoting force on the inlet pivot shaft 78, the arresting bolt 88 is engaging the stop 90 so that the degree to which the arresting bolt is threaded into the arresting split collar 84 defines the size of the inlet nip 62, and the size of the inlet nip can be adjusted by manually changing the degree to which the arresting bolt is threaded into the arresting split collar.

Whereas the inlet arresting mechanism 82 restricts rotation of the inlet pivot shaft 78 in the clockwise direction, it in general does not restrict rotation of the inlet pivot shaft in the counterclockwise direction. Accordingly and as illustrated in FIG. 8, the inlet pivot shaft 78 and the components it carries pivot in the counterclockwise direction when signatures S become jammed in the inlet nip 62.

Referring to FIG. 4, an inlet reflector 92 is rigidly mounted to the outer inlet shaft 74 that rotates with the inlet pivot shaft 78, so that the inlet reflector pivots with the inlet pivot shaft. Referring to FIGS. 4 and 7–8, an inlet sensor 94 is mounted to the rear wall 48 of the frame 44 and transmits an optical signal across the inlet area toward the front wall 46 of the frame 44. As mentioned above, the inlet arresting mechanism 82 (FIG. 10) generally does not restrict rotation of the inlet pivot shaft 78 and associated components in the counterclockwise direction, so that the inlet nip 62 is capable of becoming wider, such as when signatures S cause a jam in the inlet area, as illustrated in FIG. 8. As the inlet nip 62 becomes wider, the inlet reflector 92 pivots upward as illustrated in FIG. 8, and the optical signal transmitted by the inlet sensor 92 is reflected by the inlet reflector back to the inlet sensor. When the optical signal is reflected back to the inlet sensor 92, the inlet sensor detects the optical signal and generates a shut-down signal.

The inlet sensor 92 is connected by wires (not shown) to a controller that is hidden from view within a control housing 96 (FIG. 13). The controller controls the operations of the turning apparatus 20 in response to signals received from controls mounted at a control panel 98 (FIGS. 10 and 13) and from sensors, such as the inlet sensor 92 and other sensors discussed below. For example, the controller shuts down the turning apparatus in response to receiving the shut-down signal from the inlet sensor 92.

Intermediate Conveyor Section

Referring to FIG. 9, opposite ends of the intermediate flight 36 of the central belt 28 respectively extend around the right upper pulley 56 and a left upper pulley 100. The upper pulleys 56, 100 are mounted so that their movement is limited to rotating about their respective axes. In contrast and in addition to being rotatably mounted, the nip rollers 34 are mounted so that they can be moved in unison toward and away from the intermediate flight 36 of the central belt 28, so as to adjust the size of the intermediate nip defined between the nip rollers and the intermediate flight of the central belt, as will be discussed in greater detail below.

Referring to FIGS. 3–5, 9, and 13, the intermediate conveyor section further includes four driven intermediate conveyor belts 102 respectively including signature-engaging flights for conveying the signatures S through the intermediate conveyor section. Some of the pulleys around which the intermediate conveyor belts 102 extend are hidden from view in the drawings.

Intermediate Nip

Referring to FIG. 9 and as mentioned above, the intermediate nip is defined between the nip rollers 34 and the intermediate flight 36 of the central belt 28. The size of the intermediate nip is adjustable to advantageously accommodate for and securely control signatures S of different thicknesses. Referring to FIG. 12, the nip rollers 34 are rotatably mounted between guide plates 104 that are rigidly mounted to a movable carriage 106. An intermediate frame member 108 is rigidly mounted to the front wall 46 of the frame 44 and includes upright rods 110, and the carriage 106 has upright bushings 112 that respectively receive the upright rods. The upright rods 110 and bushings 112 allow for upward and downward movement of the carriage 106 with respect to the frame 44.

The weight of the carriage 106, and the items it carries, biases the carriage in the downward direction. A height adjustment assembly is provided for setting the minimum height of the carriage 106. More specifically, a cam 114 is mounted to the intermediate frame member 108 for moving forward and rearward along the intermediate frame member. The cam 114 includes an upwardly oriented inclined surface 116 engaging a downwardly oriented inclined surface 118 of the carriage 106, so that the rearward and forward movements of the cam respectively result in upward and down movement of the carriage.

The rearward and forward movements of the cam 114 are caused by a height-adjusting bolt 120 extending into a threaded bore in the cam. The height-adjusting bolt 120 is mounted so that it can be rotated about its elongate axis and so that any other movements thereof are restricted. The height-adjusting bolt 120 is rotated in one direction (i.e., is "screwed" out of the cam 114) to move the cam forward, and is rotated in the opposite direction (i.e., "screwed" into the cam) to move the cam rearward. The head of the height-adjusting screw 120 is mounted for rotating with an upper adjustment pulley 122 that can be rotated either clockwise or counterclockwise by appropriately pulling on a manually operated adjustment belt 124. The adjustment belt 124 extends around the upper adjustment pulley 122 and a lower adjustment pulley 126 (FIG. 10). Rotation of the height-adjusting bolt 120 can be remotely affected by manually and remotely operating the adjustment belt 124, as illustrated by one of the hands shown in FIG. 10.

Referring to FIG. 11, the size t' of the intermediate nip can be remotely adjusted to be larger or smaller by manually operating the adjustment belt 124 so that the size of the intermediate nip corresponds to the thickness t' of a signature S shown in the intermediate nip. Due to the height of the turning apparatus 20, it would be difficult in some circumstances for a user of the turning apparatus to readily directly observe the size t' of the intermediate nip. Advantageously, the turning apparatus 20 includes a mechanism for remotely providing an indication of the size t' of the intermediate nip. More specifically and referring to FIG. 10, an indicator plate 128 is mounted to the front wall 46 of the frame 44 in a position below and remote from the intermediate conveyor section. An indicator rod 130 extends upright through bushings 132 mounted to the front wall 46 of the frame 44. The indicator rod 130 is biased upwardly due to interaction between a collar 134 rigidly mounted to the indicator rod and a spring 136 positioned between the collar 134 and one of the bushings 132. As a result, the indicator rod 130 is biased so that the upper end of the indicator rod remains engaged to the underside of the carriage 106. The indicator rod 130 is sized and movably mounted, as discussed above, and the indicator plate 128 is positioned so that the size of the intermediate nip, which is indicated by t' in FIG. 11, remains equal to the distance t indicated in FIG. 10 between the lower end of the indicator rod and the upper surface of the indicator plate.

According to one method of a user setting up the turning apparatus 20 for use with signatures S that each have a thickness t, a signature is placed on the upper surface of the indicator plate 128 and then the adjustment belt 124 is operated to lower the lower end of the indicator rod 130 onto the signature S that is on top of the indicator plate. As a result, the size t' of the intermediate nip equals the thickness t of the signature S that is on top of the indicator plate 128.

Referring to FIGS. 3 and 5, an intermediate sensor 138 is mounted toward the rear of the turning apparatus 20 and transmits an optical signal across an upper region of the turning apparatus toward the front wall 46. Whereas the weight of the carriage 106 and the components it carries bias the carriage downward, the carriage is otherwise generally not restricted from moving upward. Accordingly, the intermediate nip is capable of becoming wider, such as when multiple signatures S become jammed in the intermediate nip. As the intermediate nip becomes wider, an intermediate reflector (not shown) that is mounted to the carriage 106 travels upward with the carriage into the path of the optical signal transmitted by the intermediate sensor 138. When the intimidate reflector travels sufficiently upward with the carriage 106 so that the intermediate reflector reaches the path of the optical signal transmitted by the intermediate sensor 138, the intermediate reflector reflects the optical signal back to the intermediate sensor. When the optical signal is reflected back to the intermediate sensor, the intermediate sensor detects the optical signal and generates a shut-down signal. The intermediate sensor is connected by wires (not shown) to the controller within the control housing 96 (FIG. 14). The controller shuts down the turning apparatus 20 in response to receiving the shut-down signal from the intermediate sensor 138.

Downstream Conveyor Section

Referring to FIG. 2, the upper and lower ends of the downstream belt 42 respectively extend around an upper pulley 140 and an inner outlet pulley 142. The upper and lower ends of the downstream flight 38 of the central belt 28 respectively extend around the left upper pulley 100 and an outer outlet pulley 144. Referring to FIGS. 3–4 and 13, the twisted sections of the downstream flight 38 of the central belt 28 and the signature-engaging flight 40 of the downstream belt 42 are forced into their face-to-face relation by spring-biased pulleys 146 that are arranged in pairs. In each pair, the spring-biased pulleys 146 are biased by their springs toward one another and a portion of the face-to-face twisted sections of the downstream flight 38 and the signature-engaging flight 40 pass therebetween in face-to-face relation. For each pair, the spring-biased pulleys 146 can move toward and away from one another so that signatures S of different thicknesses can be processed by the turning apparatus 20 and positive control is maintained over the signatures.

Guides are preferably mounted to the frame 44 and arranged along opposite edges of a substantial portion of the path of travel of the signatures S through the downstream conveyor section. The guides are not shown in the drawings in an effort to clarify the views. It is conventional to use guides in a system that conveys signatures S, so that the guides restrict undesirable movements of edges of the signatures that are distant from belts that are conveying the signatures. For example and following a single signature S through the downstream conveyor section, each of the opposite edges of the signature that extend approximately parallel to the path of travel are constrained between a pair of the guides.

Referring to FIGS. 2–3 and 13, a return flight 148 of the central belt 28 extends along a convolute path between lower ends of the upstream and downstream flights 26, 38 of the central belt. The return flight 148 extends around return pulleys 150 and is positioned so that it does not engage the stream of signatures S being carried by the turning apparatus 20. Similarly, a return flight 152 of the downstream belt 42 extends between the upper and lower ends of the signature-engaging flight 40 of the downstream belt. The return flight 152 extends around return pulleys 154 and is positioned so that it does not engage the stream of signatures S being carried by the turning apparatus 20. The upstream, intermediate and downstream flights 26, 36, 38 of the central belt 28; the upstream belt 32; and the signature-engaging flight 40 of the downstream belt 42 all extend approximately in a common plane, and each of the return flights 148, 152 includes a section that travels perpendicularly away from the plane and another section that travels perpendicularly toward the plane, which results in efficient use of space within the turning apparatus.

Outlet Diverter

An outlet diverter is provided for diverting the signatures S being discharged from the downstream conveyor section from the downward direction toward the horizontal direction and back onto the conventional conveyor 22. Referring to FIGS. 3–4 and 13–14, the outlet diverter includes two diverter belts 156, with each respectively extending around an upstream diverter pulley 158 (FIG. 3) and a downstream diverter pulley 160. The upstream diverter pulleys 158 are rotatably carried along with, and on opposite sides of, the inner outlet pulley 142 (FIG. 2) by an inner outlet shaft 162. Additionally, the upstream diverter pulleys 158 are linked to, or a common structure with, the inner outlet pulley 142. As a result, the diverter belts 156 are driven by virtue of the downstream belt 42 being driven.

The opposite ends of the inner outlet shaft 162 are rotatably carried by the front and rear walls 46, 48 of the frame 44. The downstream diverter pulleys 160 are respectively rotatably carried by shafts protruding from diverter split collars 164 that are rigidly mounted to the inner outlet shaft 162, so that the downstream diverter pulleys rotate with the inner outlet shaft.

Referring to FIG. 10, although the inner outlet shaft 162 is mounted to be capable of freely rotating about its elongate axis, an outlet locking mechanism 166 is provided for restricting the rotating of the inner outlet shaft relative to the frame. The outlet locking mechanism 166 functions identically to the inlet locking mechanism 68 (described above with reference to the inlet diverter) to selectively prevent rotation of (i.e., lock) the inner outlet shaft and allow rotation of (i.e., unlock) the inner outlet shaft.

The inner outlet shaft 162 can be manually rotated about its elongate axis, while it is unlocked, so that the downstream diverter pulleys 160 can be pivoted between a diverting configuration illustrated in FIGS. 3–4 and 14, and a bypassing configuration (not shown). In the diverting configuration, the downstream diverter pulleys 160 are at a relatively low elevation for diverting the signatures S being discharged from the downstream conveyor section from the downward direction toward the horizontal direction back on to the conventional conveyor 22. The downstream diverter pulleys 160 are at a relatively high elevation so that the signatures carried by the conventional conveyor bypass the turning apparatus 20 while the downstream diverter pulleys are in the bypass configuration. The downstream diverter pulleys 160 can be locked in either the diverting configuration or the bypassing configuration by operating the outlet locking mechanism 166.

Outlet Nip

Referring to FIGS. 3–4 and 13–14 an outlet nip is partially defined between the lower portions of the downstream flight 38 of the central belt 28 and the signature-engaging flight 40 of the downstream 42. The outlet nip can also be characterized as being at least partially defined by the outer outlet pulley 144, since it controls the position of the lower portion of the downstream flight 38, and outlet rollers 168 that are on opposite sides of the outer outlet pulley. The outlet rollers 168 rotate with the outer outlet pulley 144 because they are linked to, or a common structure with, the outer outlet pulley. The outlet rollers 168 at least partially define the outlet nip because they are respectively in face-to-face relation with the diverter belts 156.

Referring to FIGS. 3 and 13, the outer outlet pulley 144 and the outlet rollers 168 are rotatably carried by an outer outlet shaft 170. The opposite ends of the outer outlet shaft 170 are rigidly mounted to outlet split collars 172 that are rigidly mounted to an outlet pivot shaft 174. The opposite ends of the outlet pivot shaft are rotatably carried by the front and rear walls 46, 48 of the frame 44. The biasing member 80 (FIG. 3) is connected to the most forward one of the outlet split collars 172. The biasing member 80 biases the outlet pivot shaft 174, and therefore the outlet split collars 172 and the outer outlet shaft 170, to rotate counterclockwise.

Referring to FIG. 10, an adjustable outlet arresting mechanism 176 is provided at the front of the turnover apparatus 20 for arresting the counterclockwise rotation of the outlet pivot shaft 174 when the rotation reaches a predetermined amount. Except for arresting movement in the opposite direction, the outlet arresting mechanism 176 functions identically to the inlet arresting mechanism 82 (FIG. 10) described above with reference to the inlet nip.

Whereas the outlet arresting mechanism 176 restricts rotation of the outlet pivot shaft 174 in the counterclockwise direction, it in general does not restrict rotation of the outlet pivot shaft in the clockwise direction. Accordingly and as illustrated in FIG. 14, the outlet pivot shaft 174 and the components it carries pivot in the clockwise direction when signatures become jammed in the outlet nip.

Referring to FIG. 4, an outlet reflector 178 is rigidly mounted to the outer outlet shaft 170, so that the outlet reflector pivots with the outlet pivot shaft 174. Referring to FIGS. 4 and 14, an outlet sensor 180 is mounted to the rear wall 48 of the frame 44 and transmits an optical signal across the outlet area toward the front wall 46. As mentioned above, the outlet arresting mechanism 176 (FIG. 10) generally does not restrict rotation of the outlet pivot shaft 174 and associated components in the clockwise direction. As a result, the outlet nip is capable of becoming wider, such as when signatures S cause a jam in the outlet nip, as illustrated in FIG. 14. As the outlet nip becomes wider, the outlet reflector 178 pivots upward as illustrated in FIG. 14, and the optical signal transmitted by the outlet sensor 180 is reflected by the outlet reflector back to the outlet sensor. When the optical signal is reflected back to the outlet sensor 180, the outlet sensor detects the optical signal and generates a shut-down signal. The outlet sensor 180 is connected by wires (not shown) to the controller within the control housing 96 (FIG. 14). The controller shuts down the turning apparatus 20 in response to receiving the shut-down signal from the outlet sensor 180.

Driving Mechanism

The majority of the pulleys of the turning apparatus 20 are idler pulleys, meaning that they are turned by their respective belt as opposed to driving their respective belt. On the other hand and referring to FIGS. 3–6, and 13, each of the pulleys respectively carried by drive shafts 182 are drive pulleys, meaning that they drive their respective belts as opposed to being driven by their respective belts.

Referring to FIG. 6, a servo-motor 184 is mounted to the frame 44 and drives a primary drive pulley 186 that is mounted to the output shaft of the motor. The primary drive pulley 186 drives a drive belt 188 extending around secondary drive pulleys 190 and an idler pulley 192. Referring to FIGS. 3–6 and 13, the secondary drive pulleys 190 are respectively rigidly mounted to the drive shafts 182. The opposite ends of the drive shafts 182 are rotatably carried by the front and rear walls 46, 48 of the frame 44, so that the drive shafts rotate in response to operation of the motor 184. Likewise, the drive pulleys respectively carried by the drive shafts 182 are rigidly mounted thereto so that they and the belts they carry rotate in response to operation of the motor 184.

Many modifications and other embodiments of the invention will come to mind to one skilled in the art to which this invention pertains having the benefit of the teachings presented in the foregoing descriptions and the associated drawings. Therefore, it is to be understood hat the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A turning apparatus for turning over signatures as they are serially advanced along a conveyor, comprising:
    a conveyor belt system for:
        lifting the advancing signatures from the conveyor and conveying the lifted signatures along an upright path of travel,
        turning the advancing signatures from the upright path of travel to a downward path of travel,
        depositing the advancing signatures from the downward path of travel back onto the conveyor, and
        rotating the advancing signatures 180° about an axis which is parallel to their path of travel during either their upward path of travel or their downward path of travel so that the signatures are turned over when deposited back onto the conveyor.

2. A turning apparatus that is capable of occupying a relatively small amount of floor space and is for receiving a stream of signatures and turning over the signatures, comprising:
    a frame; and
    a conveyor system mounted to the frame for carrying the stream of signatures, the conveyor system including:
        a driven first belt having an upright upstream flight for engaging and conveying the stream of signatures in an upward direction, and an upright downstream flight that is downstream of the upstream flight in the stream of signatures and is for engaging and conveying the stream of signatures in a downward direction, with one of the flights having a twisted section that is twisted substantially 180 degrees about an axis parallel to the flight, and
        a driven second belt having a twisted section that is twisted substantially 180 degrees, runs in face-to-face relation with the twisted section of the first belt, and is for engaging and conveying the stream of signatures so that the twisted sections of the first and second belts cooperate to twist the stream of signatures substantially 180 degrees about the axis while conveying the stream of signatures.

3. A turning apparatus according to claim 2, wherein the twisted section of the first belt is in the downstream flight of the first belt.

4. A turning apparatus according to claim 2, wherein the first belt further includes an intermediate flight for engaging and conveying the stream of signatures between the upstream and downstream flights.

5. A turning apparatus according to claim 2, wherein the upstream and downstream flights extend approximately in a common plane, the first belt further includes a return flight extending from a bottom of the downstream flight to a bottom of the upstream flight, and a first portion of the return flight travels away from the plane and a second portion of the return flight travels toward the plane so that the return flight defines a convolute path and does not engage the stream of signatures being conveyed by the conveyor system.

6. A turning apparatus according to claim 2, wherein the second belt includes an upright flight for engaging and conveying the stream of signatures, the twisted section of the second belt is within the upright flight of the second belt, the upright flight of the second belt extends approximately in a common plane with the upstream and downstream flights of the first belt, the second belt further includes a return flight extending from a bottom to a top of the upright flight of the second belt, and a first portion of the return flight travels away from the plane and a second portion of the return flight travels toward the plane so that the return flight defines a convolute path and does not engage the stream of signatures being conveyed by the conveyor system.

7. A turning apparatus according to claim 2, wherein the conveyor system includes:
an upstream conveyor section that includes the upstream flight of the first belt and is for conveying the stream of signatures in the upward direction; and
a downstream conveyor section that includes the downstream flight of the first belt and is for conveying the stream of signatures in the downward direction.

8. A turning apparatus according to claim 7, wherein the downstream conveyor section further includes the second belt and the twisted sections of the first and second belts are within the downstream conveyor section.

9. A turning apparatus according to claim 8, wherein the downstream conveyor section further includes a plurality of pairs of opposed pulleys, and for each pair the first and second belts travel between the pulleys, and at least one of the pulleys is mounted for moving toward and away from the other pulley and is biased toward the other pulley so that the pulleys maintain the first and second belts in face-to-face relation and the turning apparatus can accommodate signatures of different thickness.

10. A turning apparatus according to claim 7, further comprising an inlet diverter, wherein the upstream conveyor section has an inlet end into which the stream of signatures are drawn, and the inlet diverter is proximate the inlet end of the first conveyor section for turning the stream of signatures from a generally horizontal direction toward the upward direction and into the inlet end of the first conveyor section.

11. A turning apparatus according to claim 10, wherein the inlet diverter includes an inlet scoop having an upstream edge, the inlet scoop is mounted for moving between diverting and bypass configurations, the upstream edge of the inlet scoop is at a first elevation for diverting the stream of signatures into the inlet end of the first conveyor section while the inlet scoop is in the diverting configuration, and the upstream edge of the inlet scoop is at a second elevation, which is above the first elevation, for allowing the stream of signatures to bypass the turning apparatus while the inlet scoop is in the bypass configuration.

12. A turning apparatus according to claim 7, further comprising an outlet diverter, wherein the second conveyor section has an outlet end from which the stream of signatures are discharged, and the outlet diverter is proximate the outlet end of the second conveyor section for turning the stream of signatures from the downward direction toward a horizontal direction.

13. A turning apparatus according to claim 12, wherein the outlet diverter includes a diverter conveyor having a downstream end, the diverter conveyor is mounted for moving between diverting and bypass configurations, the downstream end of the diverter conveyor is at a first elevation for turning the stream of signatures discharged from the second conveyor section toward the horizontal direction while the diverter conveyor is in the diverting configuration, and the downstream end of the diverter conveyor is at a second elevation, which is above the first elevation, for allowing the stream of signatures to bypass the turning apparatus while the diverter conveyor is in the bypass configuration.

14. A turning apparatus according to claim 7, wherein one of the conveyor sections includes a nip, the stream of signatures pass through the nip, and the nip is at least partially defined by a roller or pulley mounted for moving in opposite directions for respectively decreasing and increasing the size of the nip so that the turning apparatus can accommodate signatures of different thickness.

15. A turning apparatus according to claim 14, further comprising an assembly for restricting movement of the roller or pulley in the direction that decreases the size of the nip.

16. A turning apparatus according to claim 14, further comprising a sensor for sensing when the nip is a predetermined size that is indicative of the stream of signatures becoming jammed in the turning apparatus, with the sensor providing a signal for shutting down the turning apparatus when the nip is the predetermined size.

17. A turning apparatus according to claim 14, wherein the first conveyor section has an inlet end into which the stream of signatures are drawn, and the inlet end includes the nip.

18. A turning apparatus according to claim 17, wherein the first conveyor section includes a third belt extending around the pulley and the nip is defined between the first and third belts.

19. A turning apparatus according to claim 14, wherein the second conveyor section has an outlet end from which the stream of signatures are discharged, and the outlet end includes the nip.

20. A turning apparatus according to claim 19, wherein the first belt extends around the pulley and the nip is defined between the first and second belts.

21. A turning apparatus according to claim 7, further comprising an intermediate conveyor section for conveying the stream of signatures between the first conveyor section and the second conveyor section, wherein the intermediate conveyor section includes a nip, the stream of signatures pass through the nip, and the nip is at least partially defined by a roller or pulley mounted for moving in opposite directions for respectively decreasing and increasing the size of the nip.

22. A turning apparatus according to claim 21, wherein the intermediate conveyor section includes a third flight of the first belt for engaging and conveying the stream of signatures conveyed by the intermediate conveyor section, and the nip is defined between the roller and the third flight of the first belt.

23. A turning apparatus according to claim 21, further comprising an adjustment mechanism for remotely adjusting the size of the nip.

24. A turning apparatus according to claim 23, wherein the adjustment mechanism includes a cam movably mounted to the a portion of the frame and having an inclined surface, a driver for moving the cam in opposite directions across the frame, and a movable member that carries the roller and is mounted for moving toward and away from the portion of the frame, and wherein the movable member has an inclined surface engaging the inclined surface of the cam so that the movement of the cam in the opposite directions respectively moves the movable member and the roller toward and away from the portion of the frame so that the size of the nip is respectively decreased and increased.

25. A turning apparatus according to claim 24, further comprising an indicator member that moves with the movable member and includes a remote portion that is below and distant from the nip, wherein the remote portion is proximate a stationary reference and the distance between the remote portion and the stationary reference remains about equal to the size of the nip as the size of the nip is adjusted.

26. A turning apparatus for turning over signatures that are serially advanced in a generally horizontal direction along a conveyor, comprising:

a inlet diverter for lifting the signatures from the conveyor and turning signatures from the generally horizontal direction toward an upward direction, an upstream conveyor section for receiving the signatures from the inlet diverter and conveying the signatures along an upright path of travel, an intermediate conveyor section for turning the signatures from the upright path of travel to a downward path of travel, a downstream conveyor section for receiving the signatures from the intermediate conveyor section and conveying the signatures along the downward path of travel, and an outlet diverter for receiving the signatures from the downstream conveyor section and turning the signatures from the downward path of travel to the generally horizontal direction and depositing the stream of signatures onto the conveyor, wherein one of the upstream and downstream conveyor sections is for rotating the stream of signatures 180° about an axis which is parallel to its path of travel so that the stream of signatures are turned over when deposited back onto the conveyor.

27. A turning apparatus according to claim 26, wherein the inlet diverter includes an inlet scoop having an upstream edge, the inlet scoop is mounted for moving between diverting and bypass configurations, the upstream edge of the inlet scoop is at a first elevation for diverting the signatures into the first conveyor section while the inlet scoop is in the diverting configuration, and the upstream edge of the inlet scoop is at a second elevation, which is above the first elevation, for allowing the signatures to bypass the turning apparatus while the inlet scoop is in the bypass configuration.

28. A turning apparatus according to claim 26, wherein the outlet diverter includes a diverter conveyor having a downstream end, the diverter conveyor is mounted for moving between diverting and bypass configurations, the downstream end of the diverter conveyor is at a first elevation for turning the signatures discharged from the second conveyor section toward the horizontal direction while the diverter conveyor is in the diverting configuration, and the downstream end of the diverter conveyor is at a second elevation, which is above the first elevation, for allowing the signatures to bypass the turning apparatus while the diverter conveyor is in the bypass configuration.

29. A turning apparatus according to claim 26, wherein one of the conveyor sections includes a nip, the signatures pass through the nip, and the nip is at least partially defined by a roller or pulley mounted for moving in opposite directions for respectively decreasing and increasing the size of the nip so that the turning apparatus can accommodate signatures of different thickness, and wherein the turning apparatus further comprises:

an assembly for restricting movement of the roller or pulley in the direction that decreases the size of the nip, and a sensor for sensing when the nip is a predetermined size, with the sensor providing a signal for shutting down the turning apparatus when the nip is the predetermined size.

30. A turning apparatus according to claim 26, wherein one of the conveyor sections includes a nip, and the signatures pass through the nip, and wherein the turning apparatus further comprises:

a cam movably mounted to a portion of the frame and having an inclined surface, a driver for moving the cam in opposite directions across the portion of the frame, and a movable member that carries structure defining the nip and is mounted for moving toward and away from the portion of the frame, wherein the movable member has an inclined surface engaging the inclined surface of the cam so that the movement of the cam in the opposite directions respectively moves the movable member toward and away from the portion of the frame so that the size of the nip is respectively decreased and increased.

31. A turning apparatus according to claim 30, further comprising an indicator member that moves with the movable member and includes a remote portion that is below and distant from the nip, wherein the remote portion is proximate a stationary reference and the distance between the remote portion and the stationary reference remains about equal to the size of the nip as the size of the nip is adjusted.

32. A method of turning over signatures as they are serially advanced along a conveyor, comprising the steps of:

lifting the advancing signatures from the conveyor and conveying the lifted signatures along an upright path of travel, turning the advancing signatures from the upright path of travel to a downward path of travel, depositing the advancing signatures from the downward path of travel back onto the conveyor, and rotating the advancing signatures 180° about an axis which is parallel to their path of travel during either their upward path of travel or their downward path of travel so that the signatures are turned over when deposited back onto the conveyor.

* * * * *